United States Patent
Lee et al.

(10) Patent No.: US 8,505,104 B2
(45) Date of Patent: Aug. 6, 2013

(54) APPARATUS AND METHOD FOR RECORDING AND REPRODUCING IMAGES

(75) Inventors: Jooyoung Lee, Daejeon (KR); Sungkyong Un, Daejeon (KR); Dowon Hong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 436 days.

(21) Appl. No.: 12/614,882

(22) Filed: Nov. 9, 2009

(65) Prior Publication Data

US 2010/0146636 A1    Jun. 10, 2010

(30) Foreign Application Priority Data

Dec. 8, 2008   (KR) .................. 10-2008-0124119

(51) Int. Cl.
    *G06F 21/00*    (2006.01)
(52) U.S. Cl.
    USPC ........... 726/26; 726/22; 713/193; 360/60
(58) Field of Classification Search
    USPC ............... 726/22–27; 360/60; 713/193
    See application file for complete search history.

(56) References Cited

U.S. PATENT DOCUMENTS

| | | | |
|---|---|---|---|
| 5,598,531 A * | 1/1997 | Hill | 726/24 |
| 2004/0071311 A1* | 4/2004 | Choi et al. | 382/100 |
| 2004/0153784 A1 | 8/2004 | Lee | |
| 2006/0173564 A1* | 8/2006 | Beverly | 700/94 |
| 2009/0144831 A1* | 6/2009 | Un et al. | 726/26 |
| 2011/0138459 A1* | 6/2011 | Bae et al. | 726/19 |

FOREIGN PATENT DOCUMENTS

| KR | 1020020018988 | 3/2002 |
|---|---|---|
| KR | 1020030086635 | 11/2003 |
| KR | 1020040016523 | 2/2004 |
| KR | 1020050081007 | 8/2005 |

* cited by examiner

*Primary Examiner* — Hadi Armouche
(74) *Attorney, Agent, or Firm* — Nelson Mullins Riley & Scarborough LLP (57) ABSTRACT

Provided is imparting authentication codes to image data photographed by a camera connected to the apparatus for recording and reproducing images to generate encryption data and monitors control instructions input from the outside to the apparatus for recording and reproducing images, thereby interrupting the control instructions that store or cancel the image data stored in the apparatus for recording and reproducing images. As a result, the integrity of the image data cannot be questioned. Further, when the image data stored in the apparatus for recording and reproducing images are submitted as evidence, the integrity of the image data and the information on the corresponding image data submitted as evidence can be verified by using the authentication data generated for the original image data.

15 Claims, 6 Drawing Sheets

APPARATUS AND METHOD FOR RECORDING AND REPRODUCING IMAGES

RELATED APPLICATIONS

The present application claims priority to Korean Patent Application Serial Number 10-2008-0124119, filed on Dec. 8, 2008, the entirety of which is hereby incorporated by reference.

BACKGROUND OF THE INVENTION

1. Field of the Invention

The present invention relates to an apparatus and method for recording and reproducing images, and in particular, to an apparatus and method for recording and reproducing images capable of preventing image data photographed by a camera from being counterfeited.

2. Description of the Related Art

An apparatus for recording and reproducing images converts analog signals, which are image data input to various kinds of cameras such as a CCTV camera, an IP camera, a network camera, etc., into digital signals and stores them and calls and reproduces specific image data among the stored data according to a request. The apparatus for recording and reproducing images has various functions such as a motion recognition function, a connection recording function with a sensor, an image magnification function, an editing function, etc. Recently, the apparatus for recording and reproducing images combined with a CCTV camera, an IP camera, etc., has widely been installed at government and public offices, banking facilities, a parking zone, a home, and vehicles as a security apparatus.

Recently, the possibility of using image files, which are recorded by the monitoring camera and stored in the apparatus for recording and reproducing images, is gradually becoming popular to use as legal corroborative facts in order to verify corresponding facts. However, image materials recorded by the apparatus for recording and reproducing images, can easily counterfeit the digital image materials. Subsequently, the image materials are required to be verified in terms of the admissibility of evidence through a verification procedure due to the risk of counterfeiting.

This verification procedure determines whether the proposed evidence is counterfeited by cancellation/addition/substitution/composition methods, etc., through the testimony of a team managing the apparatus for recording and reproducing images, that is, the technical review (experiment and observation) for analyzing the images, the confirmation of external contact or not, etc. Further, this method spends enormous cost to analyze and appraise the image files configured of at least 5 to 30 frames per second and has room to generate an error for the appraisal results.

In addition to this, the general apparatus for recording and reproducing images also stores the image data together with the additional information associated with the images when storing the image data and is used to generate on screen display (OSD). The OSD information is reproduced by being overlaid on the reproduction images of the image signals, when the image data is reproduced on a monitor. However, the additional information to generate the OSD such as time information, a camera name, etc., is stored in a separate storage area from the image, such that there is a large possibility of manipulating and counterfeiting the image material.

Therefore, a need exists for a method capable of easily and rapidly verifying the admissibility of evidence for the image materials.

SUMMARY OF THE INVENTION

It is an object of the present invention to provide an apparatus and method for recording and reproducing images capable of preventing image data photographed by a camera connected to the apparatus for recording and reproducing images from being counterfeited from the outside and verifying the integrity of original image data.

In order to achieve the above object, there is provided an apparatus for recording and reproducing images. The apparatus for recording and reproducing images input from a camera, includes: an image input unit that is connected to the camera; a storage unit that stores image data input through the image input unit; an interruption controller that monitors input control instructions at the time of inputting the control instructions and interrupts the corresponding control instructions when the control instructions includes a storage instruction of image data other than the image data through the image input unit or a cancellation instruction of the image data stored in the storage unit; and a controller that detects the corresponding image data among the image data stored in the storage unit and performs operations corresponding to the input control instructions.

Further, the apparatus for recording and reproducing images according to the present invention further includes an authentication code generator that generates authentication data by allocating authentication codes to the image data from the camera connected to the image input unit and information on the image data. At this time, the authentication code generator allocates the authentication codes to the corresponding image data by using unique identifiers of the apparatus for recording and reproducing images. Also, the authentication code generator generates the authentication data for each unit corresponding to any one of a frame, time, and size of the image data when generating the authentication data for the image data and the information on the image data.

Moreover, the authentication code generator allocates the authentication codes to the image data and the information on the image data, respectively, to generate separate authentication data. At this time, the authentication data are stored separately from the image data and the information on the image data are included in the image data and the information on the image data, which are stored.

In addition, the storage unit stores the image data for each unit corresponding to any one of the frame, time, and size when storing the image data.

Further, in order to achieve the above object, there is provided a method for recording and reproducing images. The method for recording and reproducing images photographed by a camera, includes: storing image data photographed by the camera; determining whether input control instructions include storage or cancellation instructions when inputting the control instructions from the outside; in the determining, interrupting the corresponding control instructions when the input control instructions includes storage or cancellation instructions and otherwise, permitting the corresponding control instructions; and detecting the corresponding image data among the stored image data according to the permitted control instructions to perform the corresponding operations.

In the storing the image data, the image data is stored for each unit corresponding to any one of the frame, time, and size.

Meanwhile, the method for recording and reproducing images further includes imparting authentication codes to the image data photographed by the camera and the information on the image data to generate authentication data. At this time, generating the authentication data allocates the authentication codes to the corresponding image data by using unique identifiers of the apparatus for recording and reproducing images. Also, generating the authentication code generates the authentication data for each unit corresponding to any one of the frame, time, and size of the image data when generating the authentication data for the image data and the information on the image data.

Moreover, generating the authentication data allocates the authentication codes to the image data and the information on the image data, respectively, to generate separate authentication data.

At this time, the authentication data are stored separately from the image data and the information on the image data or are included in the image data and the information on the image data, which are then stored.

The present invention monitors the control instructions input from a user or devices connected from the outside to the apparatus for recording and reproducing images to interrupt the control instructions that store or cancel the image data stored in the apparatus for recording and reproducing images, thereby preventing the image data photographed from the camera connected to the apparatus for recording and reproducing images from being counterfeited. Therefore, when the corresponding image data is submitted as evidence, the integrity of the image data cannot be questioned.

Moreover, when storing the image data photographed by the camera connected to the apparatus for recording and reproducing images, the present invention allocates the authentication codes to the original image data and the information on the corresponding image data by using unique identifiers of the apparatus for recording and reproducing images to generate the authentication data, such that when the image data stored in the apparatus for recording and reproducing images are submitted as evidence, the integrity of the image data and the information on the corresponding image data submitted as the evidence can be verified by using the authentication data.

In addition, when storing the image data in the apparatus for recording and reproducing images, the image data are stored for each unit (frame unit, time unit, size unit) generating the authentication codes, such that when the image data is submitted as evidence, only the image data meeting predetermined conditions can be extracted and proposed, thereby increasing convenience.

DETAILED DESCRIPTION OF THE PREFERRED EMBODIMENTS

Hereinafter, exemplary embodiments of the present invention will be described with reference to the accompanying drawings.

Figure 1:
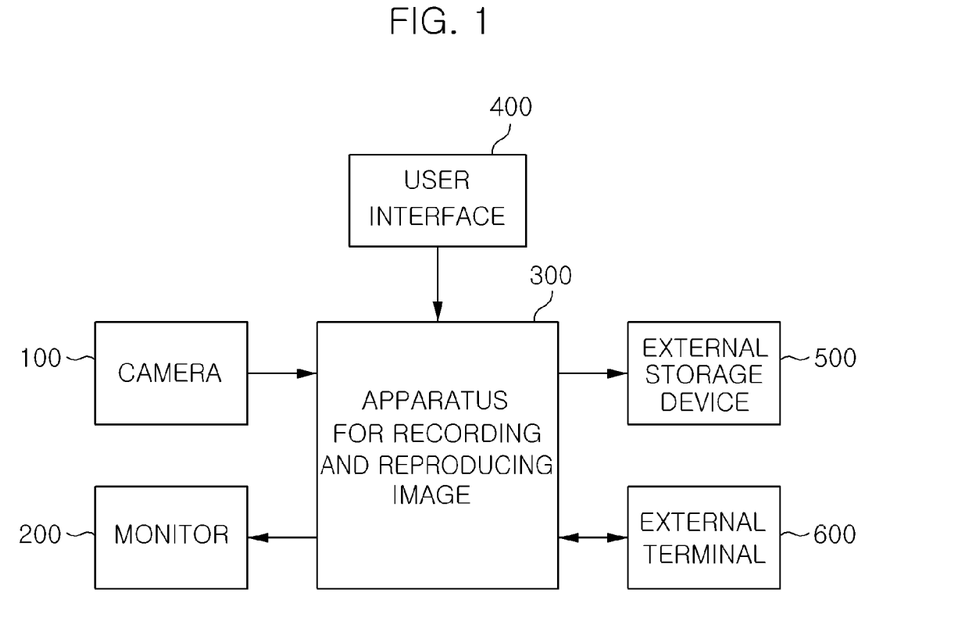
FIG. 1 is a block diagram referenced for explaining a configuration of an apparatus including an apparatus for recording and reproducing images according to one embodiment of the present invention.

FIG. 1 is a diagram referenced for explaining a configuration of an apparatus for recording and reproducing images according to the present invention. Referring to FIG. 1, the apparatus 300 for recording and reproducing images according to the present invention receives and processes image signals from a plurality of cameras 100 and stores the processed image data. Further, the apparatus for recording and reproducing images outputs the stored image data through a monitor 200 according to control instructions input through input devices such as a keypad, a remote controller, etc., or a user interface 400 including a remote control software, etc., or provides the stored image data to an external storage device 500 or an external terminal 600 that are connected to the outside.

The configuration of the apparatus for recording and reproducing images according to the present invention will now be described in more detail with reference to FIGS. 2 and 3.

Figure 2:
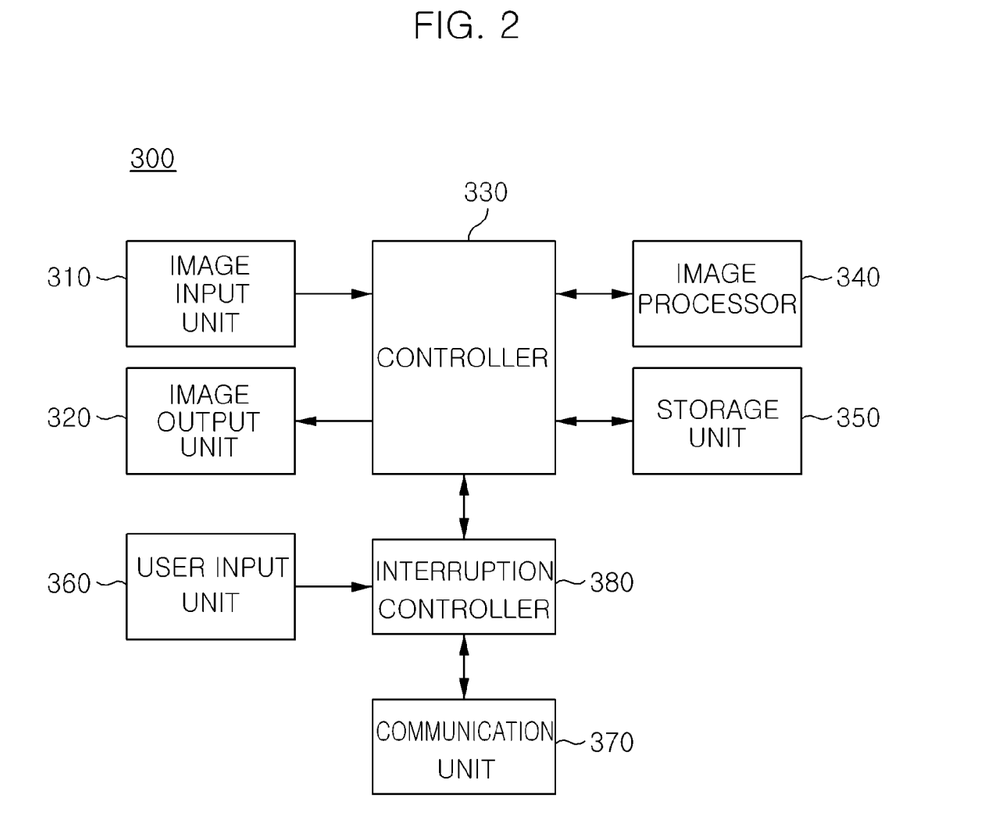
FIG. 2 is a block diagram referenced for explaining a configuration of the apparatus for recording and reproducing images according to one embodiment of the present invention.
Figure 3:
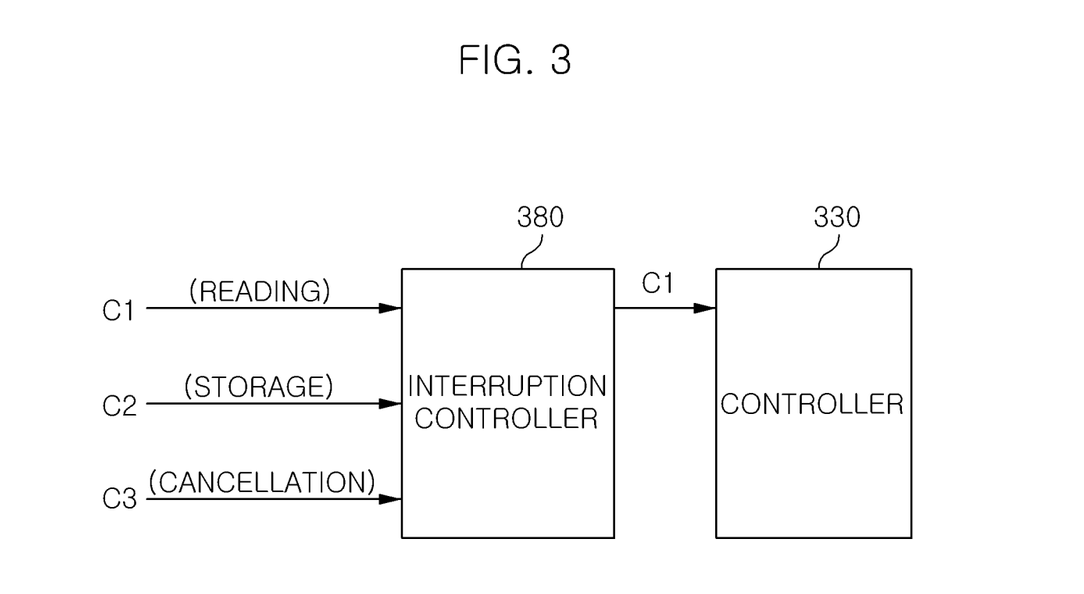
FIG. 3 is an exemplary diagram referenced for the description of FIG. 2.

First, FIG. 2 is a block diagram showing a configuration of an apparatus for recording and reproducing images according to a first embodiment of the present invention.

As shown in FIG. 2, an apparatus 300 for recording and reproducing images according to the present invention includes an image input unit 310, an image output unit 320, an image processor 340, a storage unit 350, a user input unit 360, a communication unit 370, an interruption controller 380, and a controller 330.

The image input unit 310, configured with an image input terminal and a video decoder, is connected to the plurality of cameras 100 and converts analog image signals input through the plurality of cameras 100 into digital image signals and applies them to the controller 330.

The image output unit 320 is configured of a video encoder and an image output terminal and converts and outputs the digital image signals input from the controller 330 into the analog image signals, such that the output image signals are output through a screen of the monitor 200 connected to the controller 330. The image processor 340 receives and processes the image signals input through the image input unit 310 from the controller 330. At this time, the image processor 340 includes an image divider (not shown) that collects the image signals from several digitalized channels to one place and forms divided screen images and an image compressor (not shown), which compresses the divided screen images into resolution and image quality, by meeting the setting of a user using a compression algorithm such as MPEG-4, MPEG-2, Wavelet, H.264, etc.

Herein, the image divider corresponds to a multiplexer (MUX), etc. Further, the image divider defines an order of the divided screen images formed from the image signals input through the image input unit 310 and applies them to the image compressor in order.

At this time, the image divider distributes the divided screen images according to the camera connected to the image input unit and applies them to the image compressor. For example, the image divider distributes the divided screen images at a predetermined time interval according to a recording place, a schedule, etc., of the camera connected to the image input unit and applies them to the image compressor. Therefore, the image compressor compresses the divided screen images applied at a predetermined time interval.

Meanwhile, the image compressor decompresses the applied image data when the stored image data are applied to the storage unit 350 according to the request of the controller 330.

At this time, the image processor 340 configures each divided screen image according to the number of decompressed image data and applies them to the controller 330.

In addition, the image processor 340 overlays the on screen display (OSD) the corresponding image by using additional information such as a camera name, a recording state, a recording date, a recording time, etc., for each divided screen image formed in the image divider. Therefore, when outputting the corresponding image, the image additional information overlaid on each divided screen image is displayed together. At this time, the additional information on each divided screen image formed in the image divider may be included in the corresponding image data, which are then stored in the storage unit 350, but may be separated from the corresponding image data, which are then stored in a separate data form.

The storage unit 350 receives and stores the image data compressed by the image compressor in the image processor 340 from the controller 330. Herein, the image data stored in the storage unit 350 for each unit corresponding to any one of a divided screen by the image compressor and a predetermined time interval, a predetermined frame interval, and a predetermined size interval according to the compression form of the image. Of course, the unit form where the image data are stored can be changed according to the setting and thus, is not limited to any one unit form. At this time, the storage 350 detects and provides the corresponding image data among the image data stored for each specific unit according to the request of the controller 330.

For example, when requesting the image data corresponding to the specific time from the user, the controller 330 detects the image data corresponding to the requested time among the image data stored in the storage unit 350 and provides them to the user. Of course, when the image data are stored in a predetermined frame unit, the corresponding image data are detected by detecting the frame, which corresponds to the requested time, and are provided to the user.

The user input unit 360 is connected to the interruption controller 380 and transmits the control instructions such as reading, storing, cancellation, etc., which are input through the user interface 400, to the interruption controller 380.

The communication unit 370 is connected to the interruption controller 380, which is similar to the user input unit 360, and to the external storage device 500 or the external terminal 600, etc., to transmit backup data of the image data stored in the storage unit 350 to the external storage device 500 or the external terminal 600 according to the control instructions input through the user input unit 360.

The interruption controller 380 reads the control instructions input through the user input unit 360 or the communication unit 370 to detect whether it includes the control instructions corresponding to the storage and cancellation.

Herein, the control instructions corresponding to the storage and cancellation are instructions that cancel the original image data stored in the apparatus for recording and reproducing images or replace and store the corresponding image data with the counterfeited image data. Further, the control instructions are instructions that damage the original image data stored in the apparatus for recording and reproducing images. Therefore, the interruption controller 380 monitors whether all the control instructions input through the user input unit 360 or the communication unit 370 includes the storage and cancellation instructions and interrupts the corresponding control instructions when the input control instructions includes the storage and cancellation instructions.

Of course, the interruption controller 380 permits the input of the corresponding control instructions when the input control instructions do not include the storage and cancellation instructions and applies them to the controller 330.

The embodiment thereof will be described with reference to FIG. 3. In other words, when the reading instruction for the image data is input from the external terminal 600 connected to the communication unit 370, since an input control instruction C1 does not include the storage and cancellation, the interruption controller 380 transmits the reading instruction to the controller 330, such that the controller 330 reads and reproduces the corresponding image data among the image data stored in the storage unit 350 or transmits them to the external terminal 600 through the communication unit 370.

Meanwhile, when a control instruction C2 including the storage instruction or a control instruction C3 including a cancellation instruction is input, the interruption controller 380 interrupts it, such that the input control instructions C2 and C3 are not transmitted to the controller 330.

Herein, the interruption controller 380 may be implemented by a circuit or a program code operated during a process or a separate processor from the processor.

The controller 330 controls the operations of the components to control the entire operation of the apparatus 300 for recording and reproducing images. The controller 330 processes the operations corresponding to the input control instructions when the control instructions are input from the external terminal 600 connected to the user input unit 360 or the communication unit 370. In other words, when the reading instruction is input, the image data input through the camera 100 are read, which are then output through the connected monitor in real time or the corresponding image data among the image data stored in the storage unit 350 are detected, which is then transmitted to the external storage device 500 or the external terminal 600. Herein, the controller 330 corresponds to CPU, CPLD, FPGA, etc.

Therefore, the apparatus 300 for recording and reproducing images interrupts the storage and cancellation instructions input from the outside by the interruption controller 380, such that it has a structure that can prevent the image data stored in the storage unit 350 from being cancelled or counterfeited by external manipulation, and does not store the image data cancelled or counterfeited by the external manipulation. As a result, when the corresponding image data are submitted as evidence, the original data, which has not been subjected to manipulation, can be provided.

Figure 4:
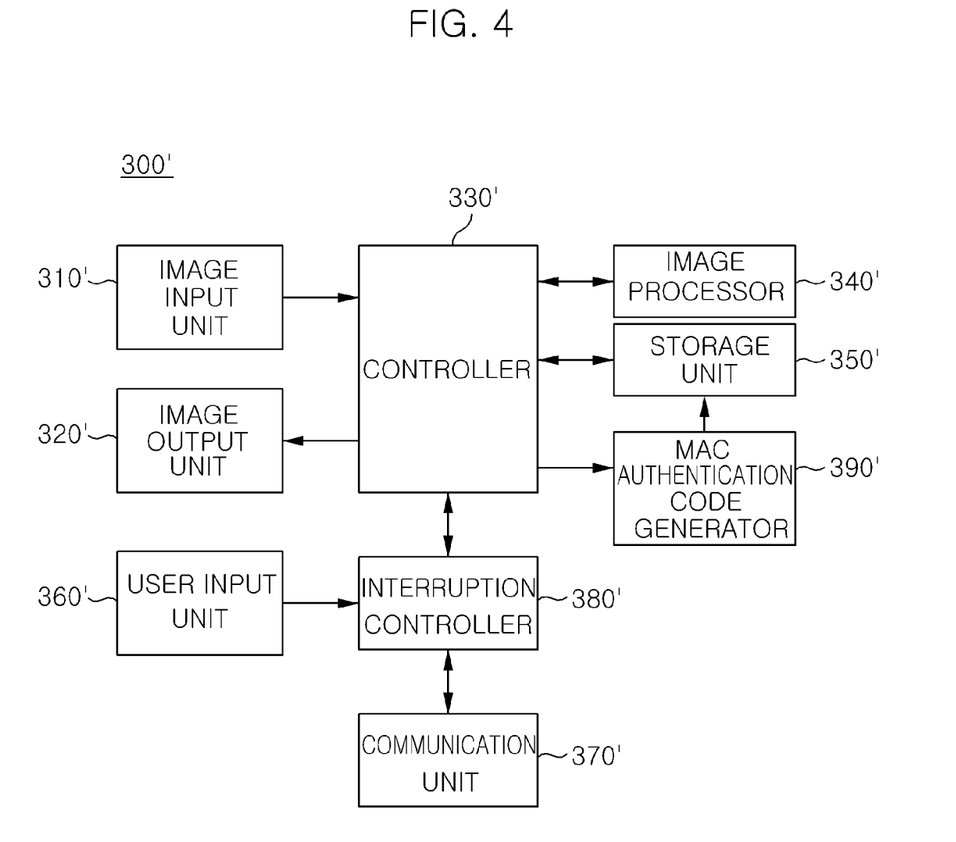
FIG. 4 is a block diagram referenced for explaining a configuration of an apparatus for recording and reproducing images according to another embodiment of the present invention.

FIG. 4 shows a configuration of an apparatus for recording and reproducing images according to a second exemplary embodiment of the present invention. At this time, an apparatus 300' for recording and reproducing images shown in FIG. 4 has the same components (310' to 380') as the apparatus for recording and reproducing images 300 of FIG. 2. The description of the same components will be replaced with the description of the first embodiment and thus, the description thereof will be omitted. However, reference numerals of the apparatus 300' for recording and reproducing images according to the second embodiment are denoted by (') to be conveniently discriminated from the components of the first embodiment and it is natural that the components of the same name indicates the same components.

Referring to FIG. 4, when the image data or the additional information on the image data are stored in the apparatus 300' for recording and reproducing images, the apparatus 300' for recording and reproducing images according to the second embodiment further includes an authentication code generator 390 that generates authentication data corresponding thereto.

The authentication code generator 390 generates authentication codes that can confirm whether the corresponding image data is counterfeited when the image data photographed from the camera 100 connected to the image input unit 310' are stored in the storage unit 350'.

In one embodiment, the authentication code generator 390 generates a message authentication code (hereinafter, referred to as 'MAC') for the corresponding image data. At this time, the MAC is generated using a hash function and uses the characteristic of the hash function that does not have a pair of different messages having the same hash values. Preferably, an initial key value for generating the MAC uses a key known only to manufacturers based on a unique hardware identifier for the apparatus for recording and reproducing images 300'.

Figure 5:
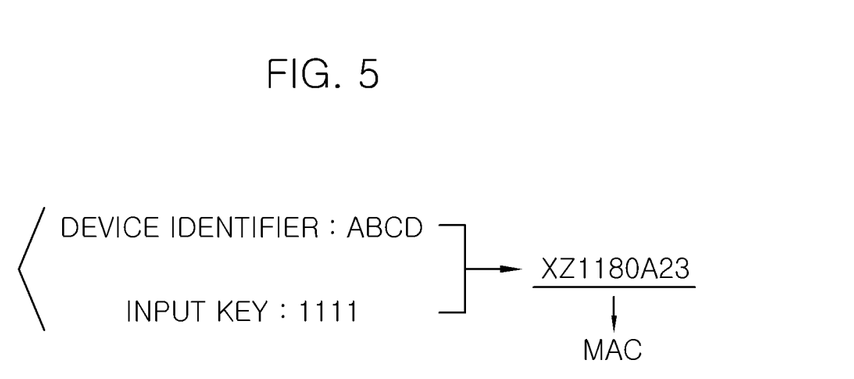
FIG. 5 is an exemplary diagram referenced for the description of FIG. 4.

The embodiment thereof will be described with reference to FIG. 5. In other words, when the unique hardware identifier for the apparatus for recording and reproducing images 300' is 'ABCD' and the initially input key for the corresponding image data is '1234', the authentication code generator 390 encrypts the 'ABCD' and '1234' using the hash function to obtain the hash result value such as 'XZ118B0A23'. The obtained hash result value then becomes MAC.

Thereby, since it is difficult to determine, from the 'XZ118B0A23' that it is the MAC values, the unique hardware identifier for the apparatus 300' for recording and reproducing images in which the corresponding image data are stored, the key known only to the manufacturers, etc., it can be confirmed whether the image data is counterfeited by comparing the MAC values using the hash function.

Of course, the initial key value is differently defined for each image data stored, such that different authentication codes are generated for each image data.

Herein, the authentication generator 390 generates the authentication data including the authentication codes imparted to the corresponding image data and stores them in the storage unit 350'. Herein, the authentication data includes summary data of the image data. Of course, the authentication codes generated for the image data may be included in the additional information on the corresponding image data so that the authentication codes and the additional information are stored together. Also, there may be various storage methods such as being included in the image data themselves, which are then stored, etc.

At this time, when the authentication code generator 390 generates the MAC, a unit of the image data, which is the object of the MAC generation, can be variously applied according to an operation plan such as a frame unit, a time unit, a size unit, etc. However, it is preferable that the image data to be provided as the evidence can be stored based on only the unit of data that is the object of the MAC generation.

At this time, the storage unit 350' stores the image data for each unit corresponding to any one of the frame, time, and size that is the object of the authentication code generation for the corresponding image data when storing the image data applied from the controller 330'. Therefore, it is possible to extract only some of the original copy and submit it as evidence, such that the admissibility of evidence of the image data can be increased.

Meanwhile, the authentication code generator 390 can generate the MAC for the image data photographed by the camera 100 as well as the additional information on the image data mapped to the image data. This prevents counterfeiting of additional information such as photograph time, camera information, etc., which is displayed together with the image data, thereby making it possible to improve the admissibility of evidence of the additional information on the image data.

Therefore, if the external user manipulates the image data stored in the apparatus 300' for recording and reproducing images or generates the authentication codes using the image data photographed by another apparatus, since he/she cannot know the initial key, he/she can generate only the summary data, which is completely different from the authentication codes generated by the manufacturers. As a result, it is possible to confirm authenticity or not by comparing the authentication codes generated by the external user and the authentication code generated by the manufacturers.

The operation of the present invention configured as described above will now be described.

Figure 6:
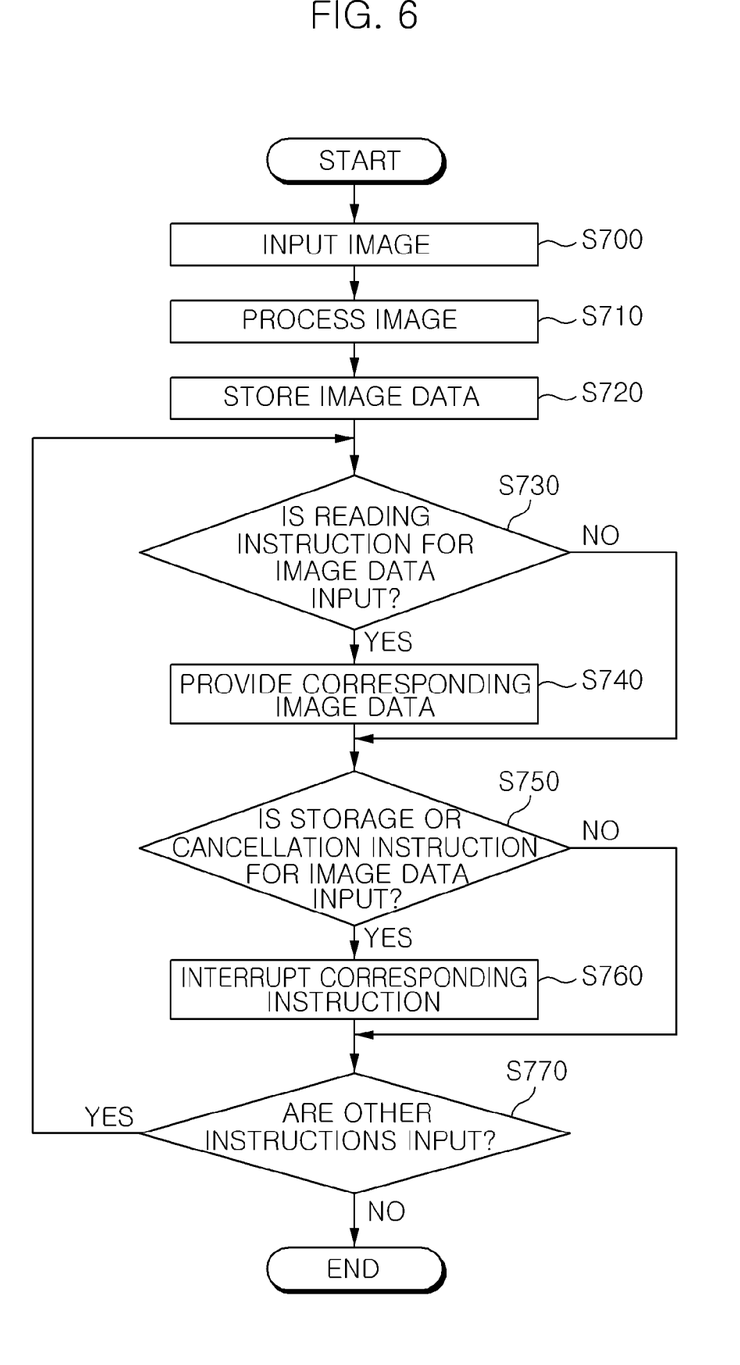
FIGS. 6 and 7 are flowcharts illustrating an operational flow of a method for recording and reproducing images according to one embodiment of the present invention.
Figure 7:
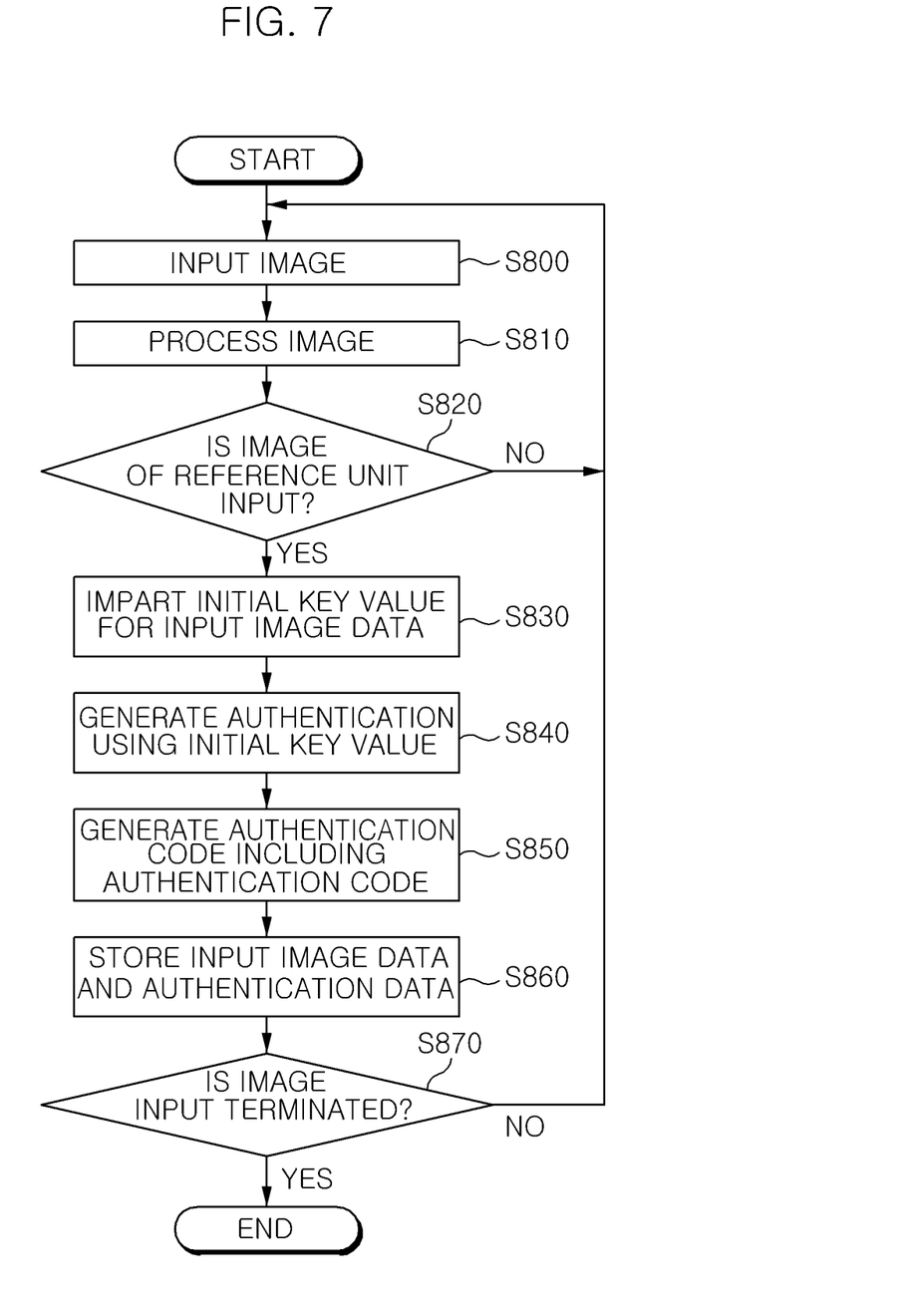

FIGS. 6 and 7 are flowcharts illustrating an operation flow of the apparatus for recording and reproducing images according to one embodiment of the present invention.

FIG. 6 shows an operational flow of monitoring external control instructions input to the apparatus for recording and reproducing images according to the present invention. Referring to FIG. 6, when the image signals photographed by the camera 100 are input through the image input unit 310 (S700), the controller 330 applies them to the image processor 340. The image processor 340 receiving the image signals processes the image signals input through the camera 100 to generate the image data (S710).

In other words, the image processor 340 forms the divided screen images from the input image signals. At this time, the order of each divided screen image formed is defined and the imaged is compressed by resolution and image quality meeting the setting of the user. Further, the image processor 340 overlays the on screen display (OSD) such as a camera name, time, etc., on the corresponding image data, such that the corresponding OSD is overlaid and output while the corresponding image signals are output to the monitor 200 through the image output unit 320 later.

At this time, the controller 330 applies the image data generated by the image processor to the storage unit 350, such that the corresponding image data is stored in the storage unit 350 (S720).

Meanwhile, when the control instructions for the image data stored in the storage unit 350 are input through the user interface 400 connected to the user input unit 360 or the external terminal 600 connected to the communication unit 370, the interruption controller 380 monitors all the input control instructions.

If the control instructions including the reading instruction for the image data stored in the storage unit 250 are input (S730), the interruption controller 380 transmits the input control instructions to the controller 330 and the controller 330 reads the corresponding image data among the image data stored in the storage unit 350 according to the input control instructions and transmits them to the image processor 340. At this time, the image processor 340 decompresses the compressed images of the corresponding image data and forms the divided screen according to the number of channels of each image, such that the corresponding image signals are output to the monitor 200 through the image output unit 320

(S740). Of course, the controller 330 reads the corresponding image data and can provide them to the external terminal 600 connected to the communication unit 370.

On the other hand, when the control instructions including the storage or cancellation instruction for the image data stored in the storage unit 350 are input from the user interface 400 connected to the user input unit 360 or the external terminal 600 connected to the communication unit 370 (S750), since the input control instructions include the storage or cancellation instructions, the interruption controller 380 interrupts the corresponding control instructions (S760).

Thereafter, when the control instructions for the image data stored in the storage unit 350 are input (S770), the 'S730' to 'S760' steps are repetitively performed, thereby making it possible to prevent the original image data photographed by the camera 100 from being damaged.

FIG. 7 shows an operational flow of generating the authentication codes for the image data when storing the image data photographed by the camera connected to the apparatus for recording and reproducing images according to the present invention.

Referring to FIG. 7, when the image signals photographed by the camera 100 are input through the image input unit 310 (S800), the controller 330 applies them to the image processor 340. The image processor 340 receiving the image signals processes the image signals input through the camera 100 to generate the image data. At this time, the controller 330 sets the reference unit for the input image data and the image processor 340 generates the image data for each reference unit set. Herein, the reference unit is any one of the frame, time, and size of the image data.

If the image in the reference unit is input (S820), the controller 330 stores the image data generated by the image processor 340 in the storage unit 350 (S860). Of course, the controller 330 drives the authentication code generator 390 to generate the authentication codes for the image data generated by the image processor 340. At this time, the authentication code generator 390 imparts the initial key values for the input image data (S830) and generates the authentication codes for the corresponding image data by using the unique hardware identifier for the apparatus for recording and reproducing images and the initial key value (S840). Further, the authentication code generator 390 generates the authentication codes generated for the corresponding image data and the authentication data including the summary data of the corresponding image data (S850) and stores them in the storage unit together with the corresponding image data (S860).

Herein, the authentication codes may be included in the image data, which are then stored and included in the additional information on the image data, which are then stored. Further, the authentication code generator 390 can generate the authentication codes for the corresponding image data as well as the authentication codes for the additional information on the corresponding image data.

As described above, the 'S800' to 'S860' steps are repetitively performed for each reference unit of the image data set by the controller 330 and when the image input ends, the apparatus 300 for recording and reproducing images 300 ends the operations (S870).

The apparatus and method for recording and reproducing images according to the present invention as described above are not limited to the configuration and method of the embodiments as described above, but the embodiments may be configured by selectively combining all the embodiments or some of the embodiments so that various modifications can be made.

What is claimed is:

1. An apparatus for recording and reproducing images input from a camera, comprising:
    an image input unit that is connected to the camera;
    a storage unit that stores image data input through the image input unit;
    an interruption controller that monitors input control instructions at the time of inputting the control instructions and interrupts the corresponding control instructions when the control instructions includes a storage instruction of image data other than the image data through the image input unit or a cancellation instruction of the image data stored in the storage unit; and
    a controller that detects the corresponding image data among the image data stored in the storage unit and performs operations corresponding to the input control instructions,
    wherein the interruption controller monitors the control instructions inputted from an outside of the apparatus for recording and reproducing the images,
    wherein the interruption controller receives the storage instruction or the cancellation instruction from a user interface and interrupts the storage instruction or the cancellation instruction received from the user interface.

2. The apparatus for recording and reproducing images according to claim 1, further comprising an authentication code generator that generates authentication codes for the image data when storing the image data photographed by the camera connected to the image input unit in the storage unit.

3. The apparatus for recording and reproducing images according to claim 2, wherein the authentication code generator generates the authentication codes for each unit corresponding to any one of a frame, time, and size of the image data when generating the authentication codes for the image data.

4. The apparatus for recording and reproducing images according to claim 3, wherein the storage unit stores the image data for each unit for the authentication code generation when storing the image data.

5. The apparatus for recording and reproducing images according to claim 2, wherein the authentication codes are included in the image data or additional information on the image data, which are then stored.

6. The apparatus for recording and reproducing images according to claim 2, wherein the authentication code generator generates the authentication data including authentication codes and summary data of the image data.

7. The apparatus for recording and reproducing images according to claim 2, wherein the authentication code generator generates the authentication codes for the additional information on the image data and generates the authentication data for the additional information on the image data, including the authentication codes.

8. The apparatus for recording and reproducing images according to claim 2, wherein the authentication code generator generates the authentication codes for the corresponding image data by using unique identifiers for the apparatus for recording and reproducing images.

9. A method for recording and reproducing images photographed by a camera, comprising:
    storing image data photographed by the camera;
    determining whether input control instructions include storage or cancellation instructions when inputting the control instructions from an outside of an apparatus for recording and reproducing the images;
    in the determining, interrupting the corresponding control instructions when the input control instructions includes storage or cancellation instructions and permitting the corresponding control instructions when the input control instructions do not include storage or cancellation instructions; and detecting the corresponding image data among the stored image data according to the permitted control instructions to perform the corresponding operations, wherein the interruption controller receives the storage or cancellation instructions from a user interface and interrupts the storage or cancellation instructions received from the user interface.

10. The method for recording and reproducing images according to claim 9, further comprising generating authentication codes for the image data photographed by the camera.

11. The method for recording and reproducing images according to claim 10, wherein the authentication codes are included in the image data or additional information on the image data, which are then stored.

12. The method for recording and reproducing images according to claim 10, wherein the generating the authentication codes includes generating the authentication codes for the additional information on the image data.

13. The method for recording and reproducing images according to claim 10, wherein the authentication codes are generated for each unit corresponding to any one of a frame, time, and a size of the image data.

14. The method for recording and reproducing images according to claim 13, wherein in the storing the image data, the image data are stored for each unit for the authentication code generation.

15. The method for recording and reproducing images according to claim 10, wherein the generating the authentication codes generates the authentication codes for the corresponding image data by using unique identifiers for the apparatus for recording and reproducing images.

* * * * *